United States Patent [19]

Chadwick

[11] Patent Number: 4,824,047
[45] Date of Patent: Apr. 25, 1989

[54] HANG GLIDER LAUNCH VEHICLE

[76] Inventor: William R. Chadwick, 3621 W. Crystal La., Santa Ana, Calif. 92704

[21] Appl. No.: 203,484

[22] Filed: Jun. 6, 1988

Related U.S. Application Data

[63] Continuation of Ser. No. 29,168, Mar. 23, 1987, abandoned.

[51] Int. Cl.$^4$ .......................... B64D 5/00; B64C 37/02
[52] U.S. Cl. ......................................... 244/2; 244/63; 244/16; 244/903
[58] Field of Search ........... 244/2, 3, 16, 13, 900–904, 244/63

[56] References Cited

U.S. PATENT DOCUMENTS

| | | | |
|---|---|---|---|
| 2,062,599 | 12/1936 | North | 244/2 |
| 2,998,208 | 8/1961 | DiPevna | 244/2 |
| 4,248,394 | 2/1981 | Klumpp | 244/903 |

FOREIGN PATENT DOCUMENTS

| | | | |
|---|---|---|---|
| 789724 | 11/1935 | France | 244/2 |
| 494399 | 10/1938 | United Kingdom | 244/2 |

Primary Examiner—Galen Barefoot
Attorney, Agent, or Firm—Leonard Tachner

[57] ABSTRACT

A lightweight, low cost, powered launch vehicle for carrying a hang glider aloft and releasing the glider for free flight provides an integral glider support frame for positioning the glider in flight-ready configuration and a selectively actuatable release device accessible to the glider operator for separation from the vehicle at a desired altitude. The support frame positions the glider so that the wing of the glider provides added lift to the launch vehicle during combined flight.

8 Claims, 4 Drawing Sheets

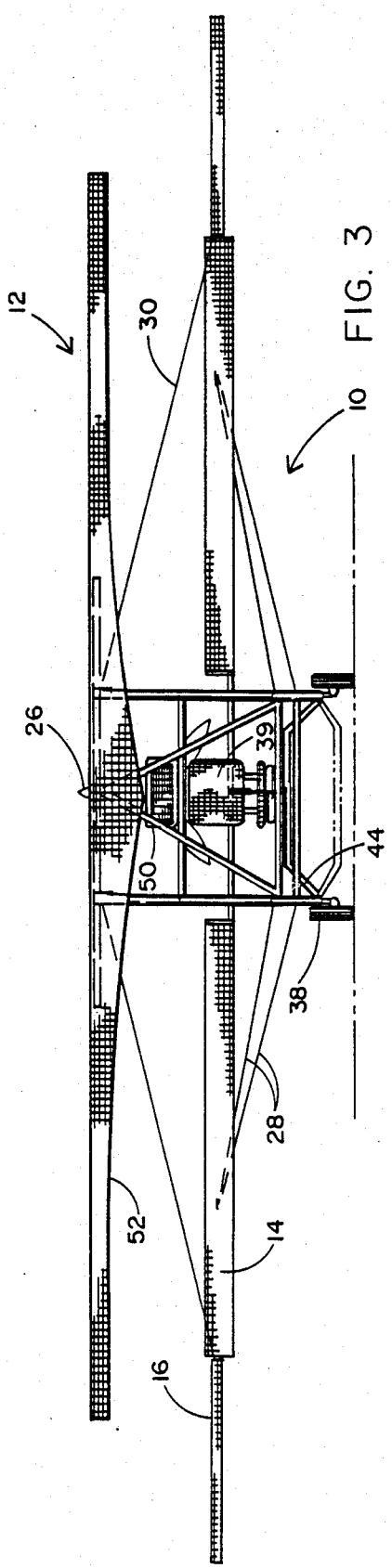
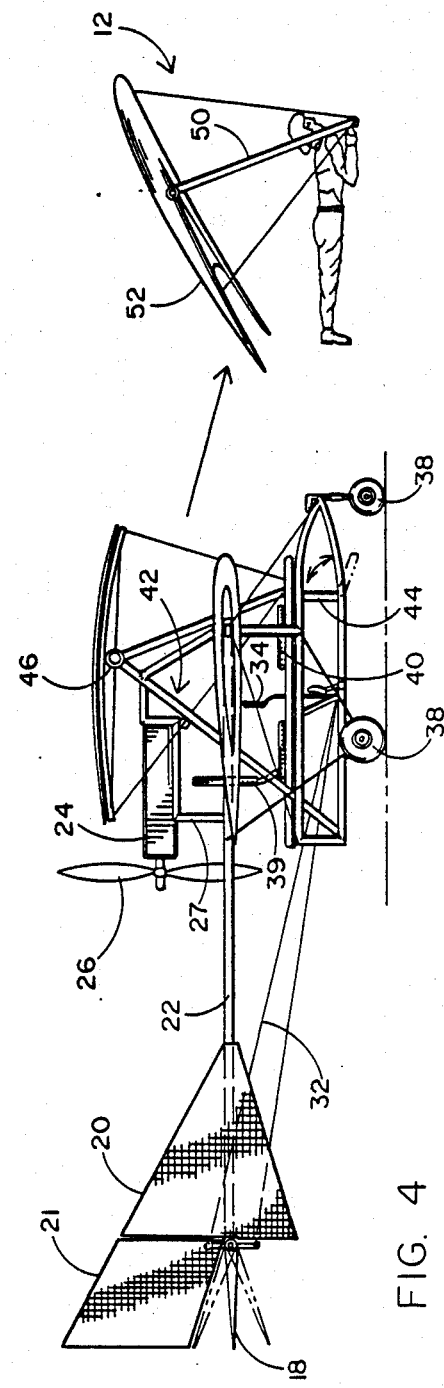
FIG. 3
FIG. 4

HANG GLIDER LAUNCH VEHICLE

This is a continuation of application Ser. No. 029,168, filed Mar. 23, 1987, now abandoned.

FIELD OF THE INVENTION

The present invention relates generally to the field of small, lightweight, powered aircraft and more specifically, to a vehicle of that type which is particularly suited for carrying aloft and launching hang gliders.

PRIOR ART

Over the last ten to fifteen years or so hang gliding has become an increasingly popular sport. The pleasure and exhilaration of gliding around the sky in control of a large kite-like apparatus of relatively low cost without the din of engine noise has attracted many enthusiasts and created a new, commercially successful sport. Unfortunately, for the most part the sport is limited to certain geographical regions where the topology of the environment provides convenient jumping points for launching the gliders. Thus for example, the hang glider sport has become popular along the coastlines where sea line cliffs provide convenient jumping points to give the hang glider operator the opportunity to immediately gain the altitude beyond the cliffs in order to exploit updrafts and the time to adjust control of the glider so that it can be successfully launched. Another convenient location, also limited in availability, relates to other forms of appropriate local technology such as a high hill top, mountain top, and the like. Unfortunately, the inherent topological limitations imposed upon the sport, namely, providing some form of jumping off point, severly restrict the popularity of the sport and therefore its commercial possibilities.

One solution to this problem is to provide a launch vehicle for hang gliders. Unfortunately, conventional aircraft do not provide a convenient means for attachment to and launch of a hang glider. Helicopters are inherently dangerous to use around hang gliders because of the high intensity downdraft the helicopter blade must develop in order to provide adequate thrust. Furthermore, flying conventional helicopters and aircraft for the sole purpose of lifting hang gliders into a suitable launch position is an impractical process because of the expense involved in operating such conventional aircraft.

There has therefore been a long-felt need for a suitable launch vehicle that can carry hang gliders aloft and launch them safely and inexpensively in order to significantly expand the possibilities for the hang glider sport such as by bringing the sport to a flat terrain where there are no inherently suitable jumping off points because of the limited natural topography of the area.

SUMMARY OF THE INVENTION

The present invention provides a lightweight, low cost, powered, launch vehicle for taking hang gliders aloft and launching them in a convenient, relatively inexpensive manner without incurring any substantial dangers to either the pilot of the launch vehicle or the operator of the hang glider. The novel launch vehicle of the present invention is in many respects conventional in structure in that it is a single engine vehicle having substantially conventional flight control surfaces such as an elevator, vertical fin, ailerons, wings and the like. However, unlike conventional aircraft, the present invention is particularly well-suited for mating with and retaining a conventionally-shaped hang glider on the ground for take-off and flight up to a suitable elevation for releasing the glider. The invention is provided with suitable means for seating the pilot of the launch vehicle as well as the operator of the hang glider and for permitting relatively easy release of the hang glider at the appropriate altitude whereafter the launch vehicle can then easily return to the landing strip where it may be readily mated with another hang glider for repeating that operation.

During the period that the hang glider and launch vehicle are mated, the wing of the hang glider adds a degree of additional lift to the launch vehicle to help compensate for the added weight of the glider and glider operator. After the hang glider is released, the reduced lift of the gliderless launch vehicle is sufficient to safely bring the pilot back to the ground. The key to the present invention is the provision of means for connecting the hang glider to the launch vehicle in such a way that the flight characteristics of the combined structure are not in any way hampered to prevent flight of the launch vehicle with glider attached. Another key feature is the provision of means for readily releasing the hang glider from the launch vehicle at the moment that the hang glider operator wishes to separate therefrom for hang gliding to commence.

In a preferred embodiment of the invention currently contemplated, the retention means and release means are provided in the form of a glider retention bracket which secures the bottom rung of the glider control triangle and a pair of glider clamps which secure the cross member of the glider frame. The glider retention bracket is relatively easy to rotate into a position where it selectively retains the hang glider relative to the launch vehicle or rotated into a position where it permits the hang glider to be released from the launch vehicle. Similarly, the glider clamps are provided with a simple pulley release mechanism which easily releases the gripping relationship between the clamps and the glider frame at the appropriate time. If these two release mechanisms are activated at approximately the same time, the hang glider operator is then in a position to readily rotate the hang glider wing in elevation sufficiently to increase the lift of the hang glider relative to the launch vehicle thereby separating the hang glider therefrom. At the same time, the pilot of the launch vehicle can readily rotate the elevator and ailerons of the launch vehicle to lower the vehicle relative to the hang glider whereby to provide a significant separation between the two craft immediately upon launch to increase the safety and decrease the likelihood of any form of inadvertent injury to the hang glider operator or launch vehicle pilot.

OBJECTS OF THE INVENTION

It is therefore a principal object of the present invention to provide a uniquely configured hang glider launch vehicle which permits the sport of hang gliding to be implemented in those topological areas where it might not otherwise be convenient to do so.

It is an additional object of the present invention to provide a hang glider launch vehicle which is low cost, lightweight, easily controlled and convenient to integrate with the hang glider for launching of same and release the hang glider thereafter at the appropriate altitude where it then may return to ground.

It is still an additional object of the present invention to provide a lightweight, low cost, powered hang glider launch vehicle which provides seating for a pilot, temporary seating for the operator of a hang glider which is of conventional configuration and which provides a relatively convenient, expedient and simple way to temporarily integrate the hang glider into the vehicle for taking the hang glider aloft without materially interfering or otherwise reducing the flying performance of the aircraft either while the hang glider is attached or after it is launched.

BRIEF DESCRIPTION OF THE DRAWINGS

The aforementioned objects and advantages as well as additional objects and advantages of the present invention will be more fully understood hereinafter as a result of a detailed description of a preferred embodiment when taken in conjunction with the following drawings in which:

FIG. 3 is a front view of the launch vehicle and hang glider combination of FIG. 2;

FIG. 4 is a side view of the launch vehicle and hang glider combination also providing a separate side view of the hang glider per se after it has been launched by the vehicle;

DETAILED DESCRIPTION OF A PREFERRED EMBODIMENT

Figure 1:
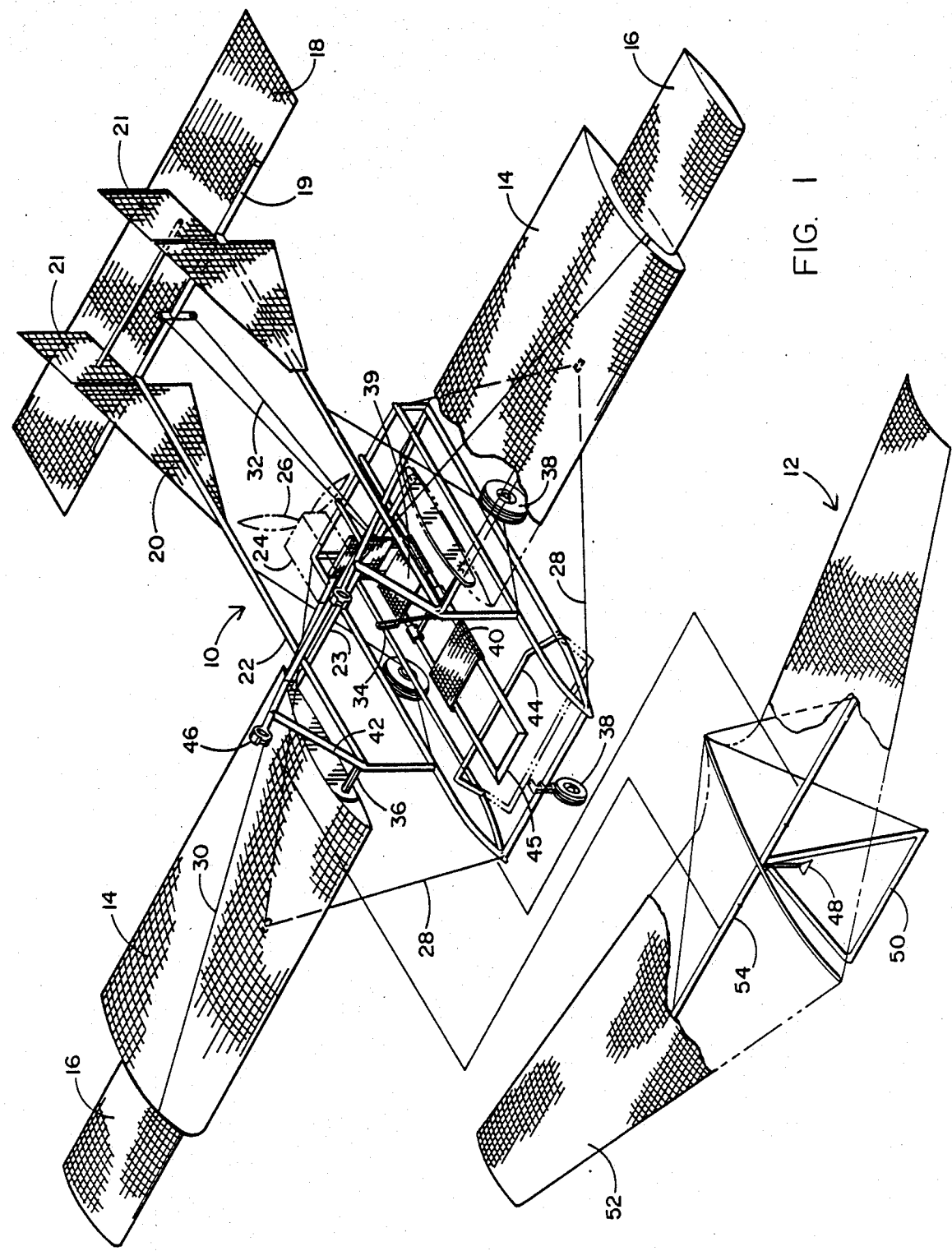
FIG. 1 is an isometric view of the launch vehicle of the present invention as well as a typical hang glider for illustrating the manner in which they may be integrated for take off.

Referring now to FIGS. 1–4, it will be seen that the launch vehicle 10 of the present invention comprises a pair of wings 14 each terminating in a respective aileron 16, an elevator 18, a pair of vertical fins 20 including rudders 21, an engine 24, a propeller 26, and supporting structure and cables. Aside from the fact that the launch vehicle 10 of the present invention is intentionally built to be extremely light, inexpensive and easy to operate, the fundamental functions of the various major components such as the wings, the various other control surfaces, the engine and propeller and the like are of a conventional nature which permit the vehicle to perform its usual function namely, taking off and landing and flying with controllable characteristics to enable turning, banking, changing elevation, yaw and so forth. Thus for example, the launch vehicle 10 is provided with a vehicle frame 22 which includes wing frame struts 36 to support the wings and ailerons, an elevator strut 19 which supports the elevator 18 as well as the necessary frame structure to support the wheels 38, the seats 39 and 40, the engine 24, the rudders 21 and so on. Cables are provided for both load support and control. Thus for example, the elevator 18 is provided with a control cable 32 which permits the elevator to be pivoted about the elevator strut 19 and by way of example, wing load cables 28 and aileron support cable 30 are also included to provide the requisite degree of additional support needed to withstand the normal loads encountered during flight, take off and landing, etc.

Figure 2:
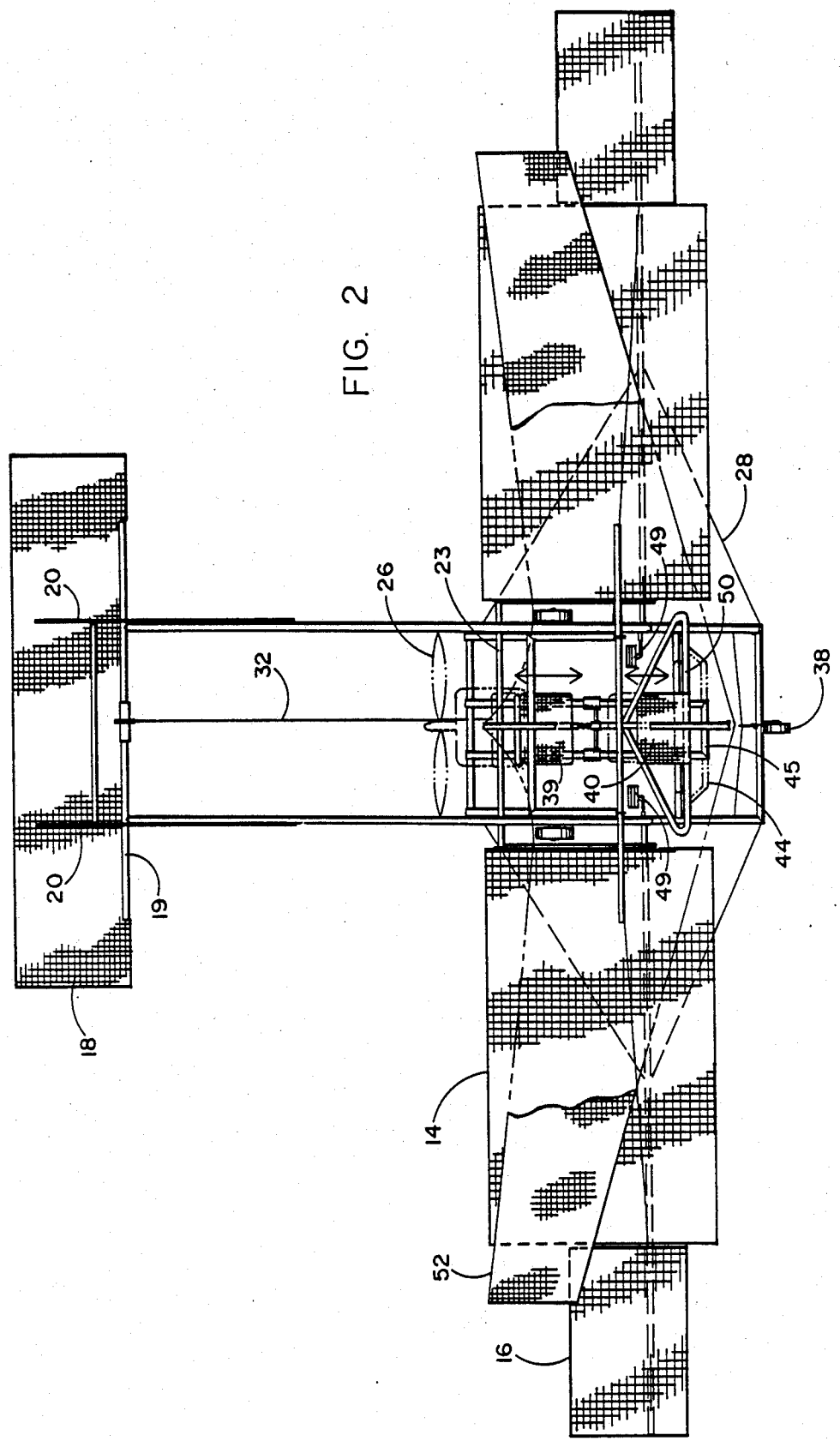
FIG. 2 is a top view of the combined launch vehicle of the present invention and a conventional hang glider in the take off configuration.
Figure 5:
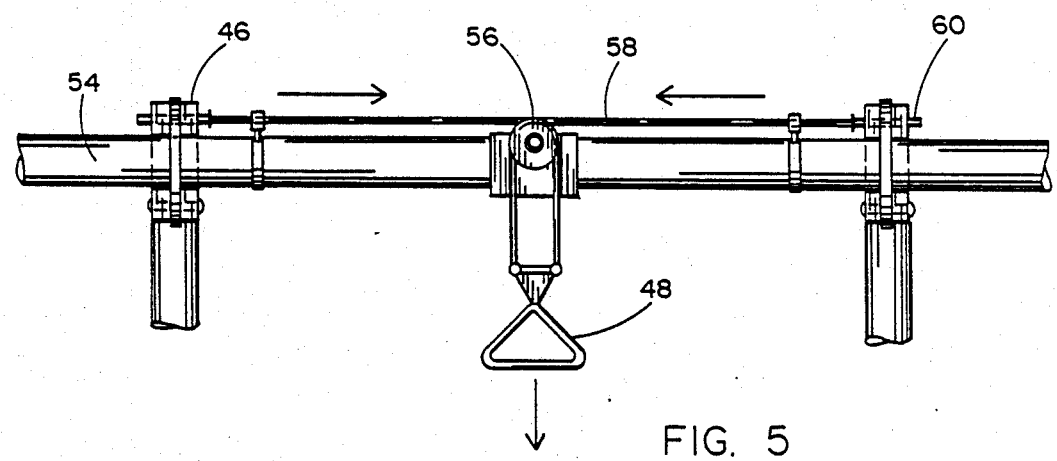
FIG. 5 is an enlarged front view of the upper launch vehicle hang glider interface indicating the status of this interface before the hang glider is released from the launch vehicle.
Figure 6:
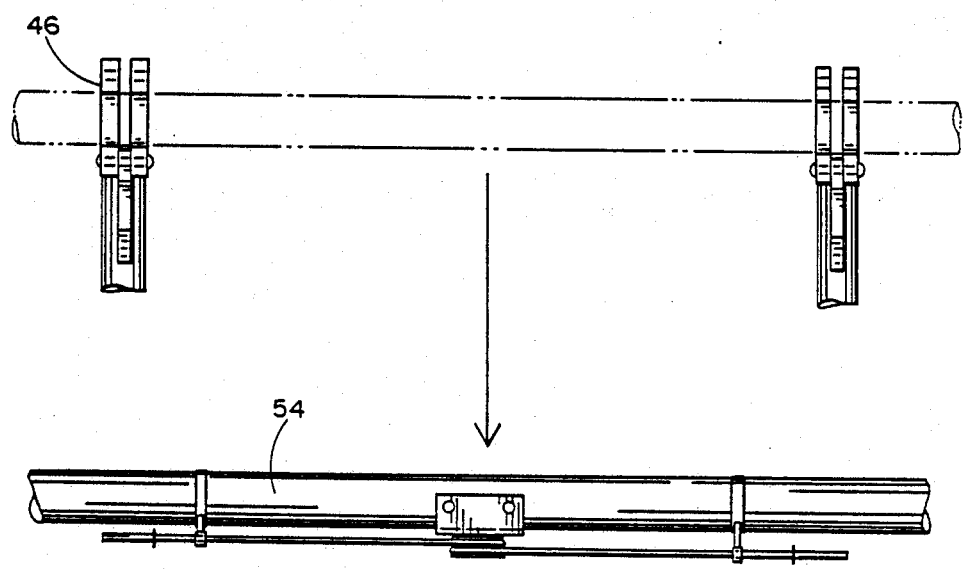
FIG. 6 is a view similar to that of FIG. 5 of the interface between the hang glider and the launch vehicle but immediately after the hang glider has been released therefrom.
Figures 7, 8, 9:
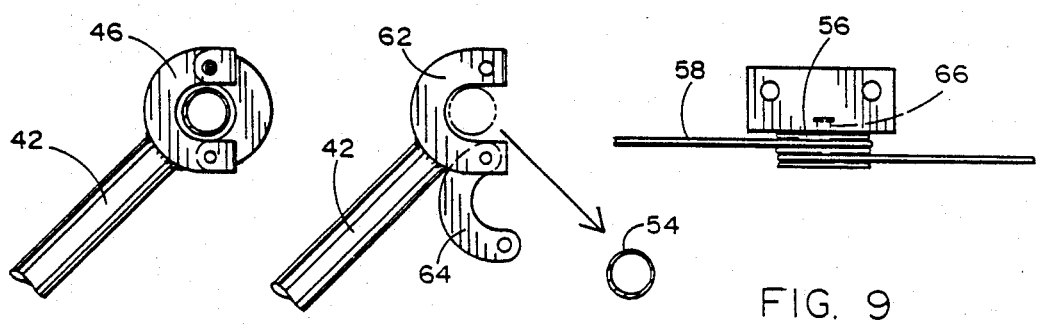
FIGS. 7 and 8 illustrate the configuration of the clamp that is used to secure the hang glider to the launch vehicle immediately prior to and subsequent to the launch of the hang glider.
FIG. 9 is a top view of the pulley and cable configuration used in conjunction with the clamp of FIGS. 7 and 8.

The pilot of the launch vehicle 10, who is positioned with his body seated in the pilot's seat 39, has control of the various surfaces needed for orientation of the aircraft as well as the thrust of the engine by means of a control stick 34 and a pair of rudder pedals 49, the latter seen best in FIG. 2. The pilot seat 39 is supported on a seat frame 45 which also provides support for the glider seat 40, the latter providing a means for the glider operator to be seated comfortably during take off and while the launch vehicle 10 gains the desired altitude before the glider is released.

The characteristics of the present invention which it is believed distinguish the invention from all prior art lightweight, powered aircraft of otherwise similar configuration, is its unique design enabling it to be a launching vehicle for a hang glider 12 shown for example in FIGS. 1 and 2. Thus, the present invention is provided with certain key and advantageous characteristics which enable it to be the base for a hang glider during take off and gaining of altitude and enable it to release the hang glider easily and safely to provide a means for "giving" the hang glider the altitude it needs to commence independent flight. The hang glider 12 is presumed to be of a relatively conventional configuration having a glider controlled triangle 50, a glider wing 52, a glider frame 54 and the usual array of interconnecting and supporting cables normally found in hang gliders in use today.

The key features of the launch vehicle 10 which are integrated into the vehicle primarily for supporting and releasing the hang glider 12, are the glider support frame 42, the glider retention bracket 44, a pair of glider clamps 46 and a glider clamp release 48. The glider support frame comprises a pair of triangular structures extending vertically above the vehicle frame 22 terminating in a pair of glider clamps 46 which are adapted to engage and retain the glider frame 54 in a manner to be described hereinafter in more detail in conjunction with FIGS. 5–9. However, for the time being it will be understood that the glider clamps 46 provide a means for securing the upper portion of the hang glider 12 to the launch vehicle 10 particularly at the glider frame 54. The glider retention bracket 44 provides a means for securing the lower portion of the hang glider 12 to the launch vehicle 10. More specifically, the glider retention bracket 44 provides an actuatable means for positioning the bottom rung of the glider control triangle 50 beneath the seat frame 45 of the launch vehicle 10. Basically, the glider retention bracket 44 functions in a manner similar to the safety bar in a roller coaster car by preventing the bottom rung of glider control triangle 50 from inadvertently swinging out from under the seat frame 45 until the glider retention bracket 44 is rotated forward to the position shown in phantom line in FIG. 1. In that position the glider control triangle 50 is free to be released from under the seat frame 45 which will normally be accomplished substantially simultaneously with the release of glider clamps 46 in the manner now to be described in conjunction with FIGS. 5-9.

Referring now to FIGS. 5-9 it will be seen that the glider frame 54, when attached to glider clamps 46, is held secured therein by the encircling configuration of the clamp 46 which comprises a stationary member 62 permanently affixed to the glider support frame 42 and a movable member 64 rotatably affixed to the stationary member 62. When the glider frame 54 is secured within the clamps 46 the movable member 64 is rotated into position relative to stationary member 62 and secured therewith by a pin 60. The pair of pins 60 are in turn connected to a common cable 58 which is positioned on a pulley 56 and connected to a glider clamp release 48. The pulley in turn is connected by means of an axle 66 to the glider frame 54. It will be understood that when the glider clamp release 48 is pulled downwardly by the hang glider operator, the pins 60 are each pulled from their respective clamps 46 thereby permitting movable member 64 to rotate away from stationary member 62 and opening clamps 46 to enable the glider frame 54 to be released therefrom. The clamp release mechanism, comprising cable 58, pulley 56 and clamp release 48, is attached to the glider frame 54 and remains with the glider after it is released from the launch vehicle. Thus, the hang glider operator may selectively choose the appropriate moment for the release of the hang glider from the launch vehicle by merely kicking the glider retention bracket 44 forward rotating it away from the seat frame 45 releasing the glider control triangle 50 while at substantially the same time pulling down on glider clamp release 48 thereby opening the clamps 46 and releasing the glider frame 54. At the time of release or immediately thereafter, the pilot of the launch vehicle and the operator of the hang glider will appropriately maneuver their respective craft whereby to increase the separation between the two craft in an appropriate direction to clear the hang glider of the launch vehicle in a safe and expeditious manner to allow the hang glider operator to carry on with his gliding activities while the launch vehicle is free to return to the ground and take on another hang glider for launching.

It will now be understood that what has been disclosed herein comprises a novel ultra-light, low cost, powered launch vehicle adapted to be integrated with a conventional hang glider for taking the glider aloft and releasing same at an appropriate altitude whereby to enable operation of hang gliders in a geographical and topological area that might not otherwise be suitable therefor. Although the launch vehicle is conventional in many respects, namely, providing various control surfaces to enable a pilot to fly the vehicle, the launch vehicle of the present invention is provided with unique hang glider interface characteristics and release mechanisms which permit a novel integration of a hang glider and the vehicle as well as safe and expeditious release thereof upon gaining the proper altitude for the hang glider operation.

Those having skill in the art to which the present invention pertains will now, as a result of the applicant's teaching herein, perceive various modifications and additions which may be made to the invention. By way of example, other means for integrating a hang glider with a launch vehicle and providing means for selectively releasing same upon the gaining of the proper altitude therefor will now occur to those having ordinary skill in the arts of small airplanes and hang gliders. Other means for attaching the hang glider to a small aircraft as well as other means for providing an expeditious and safe way to release the hang glider from the aircraft at the appropriate altitude will now also occur to those with such skills. However, it will be understood that all such modifications and additions are deemed to be within the scope of the invention which is to be limited only by the claims appended hereto.

I claim:

1. A piloted launch vehicle having aerodynamic surfaces for carrying a hang glider having a support frame and a hang glider pilot aloft and releasing the glider for free flight; the vehicle comprising:

frame means for supporting said aerodynamic surfaces, said frame means including means for supporting said launch vehicle pilot and said glider pilot within said frame means to permit unaided vocal communication therebetween;

means for powering and controlling said vehicle coupled to said frame means;

means for supporting said hang glider in flight-ready configuration on said vehicle coupled to said frame means, said means for supporting said hang glider being releasably coupled to said glider support frame at both an upper and a lower portion thereof; and, means for selectively releasing said hang glider from said vehicle by said glider pilot coupled to said means for supporting said hang glider at a desired altitude.

2. The launch vehicle recited in claim 1 wherein said glider support frame forms an integral portion of the frame of said vehicle.

3. The launch vehicle recited in claim 1 wherein said supporting means comprises a glider retention bracket having a rotatable bar for securing a first structural member of said hang glider to said vehicle.

4. The launch vehicle recited in claim 1 wherein said releasing means comprises at least one clamp having a closed configuration for holding a second structural member of said hang glider rigidly to said vehicle and having an open configuration for releasing said second structural member, and a clamp release selectively actuated for changing said clamp from said closed configuration to said open configuration.

5. The launch vehicle recited in claim 1 wherein said supporting means positions said hang glider relative to said vehicle so that the wings of said glider are in spaced, substantially parallel relation to the wings of said vehicle.

6. The launch vehicle recited in claim 1 wherein said frame means includes a seat frame having at least two seats, one such seat being for the pilot of said vehicle and the other such seat being for the operator of said hang glider.

7. The launch vehicle recited in claim 1 wherein said supporting means positions said hang glider relative to said vehicle so that said glider provides added lift to said vehicle during combined flight.

8. The launch vehicle recited in claim 4 wherein said clamp release is within easy reach of the opertor of said hang glider.

* * * * *